United States Patent [19]

Woodard

[11] Patent Number: 4,944,279
[45] Date of Patent: Jul. 31, 1990

[54] SUPERCHARGER TORSION DAMPING MECHANISM WITH FRICTION DAMPING

[75] Inventor: Steven W. Woodard, Milford, Mich.
[73] Assignee: Eaton Corporation, Cleveland, Ohio
[21] Appl. No.: 339,336
[22] Filed: Apr. 14, 1989
[51] Int. Cl.[5] ............................................. F02B 33/38
[52] U.S. Cl. ................................. 123/559.1; 418/206; 464/57; 464/62; 464/66; 464/77; 464/100
[58] Field of Search ...................... 123/559.1; 418/206; 464/57, 62, 66, 77, 100, 101, 71

[56] References Cited

U.S. PATENT DOCUMENTS

| | | | |
|---|---|---|---|
| 1,518,360 | 12/1924 | Royce | 464/66 |
| 2,115,819 | 5/1938 | Lewis | 192/68 |
| 2,963,006 | 12/1960 | Karde | 123/41.33 |
| 2,989,857 | 6/1961 | Helland et al. | 64/11 |
| 3,002,594 | 10/1961 | Haseler | 464/57 |
| 3,195,324 | 7/1965 | Sellwood et al. | 64/14 |
| 3,226,579 | 12/1965 | Bygdnes | 464/71 |
| 3,236,066 | 2/1966 | Fredrickson | 464/77 |
| 4,171,627 | 10/1979 | Fukuda | 64/15 |
| 4,212,380 | 7/1980 | Billet | 192/106.2 |
| 4,327,563 | 5/1982 | Allmacher | 464/100 |
| 4,564,345 | 1/1986 | Mueller | 418/206 |
| 4,638,570 | 1/1987 | Soeters | 33/562 |

FOREIGN PATENT DOCUMENTS

| | | | |
|---|---|---|---|
| 285573 | 1/1953 | Switzerland | 123/559.1 |
| 556209 | 9/1943 | United Kingdom | 60/624 |

Primary Examiner—Douglas Hart
Attorney, Agent, or Firm—P. S. Rulon

[57] ABSTRACT

An intake manifold (18) for an engine (10) includes a Roots-type supercharger (26) having a torsion damping mechanism (54) for reducing audible gear tooth rattle of timing gears (72,74) which prevent contact of meshed lobes (28c, 29a) of the supercharger rotors (28,29). The damping mechanism includes a drive member (90) having an annular band portion (90d) banded about an annular member (100) formed of relatively soft elastomeric material which is fixed for rotation with the drive member via lugs (90e). The member (100) includes three arcuate slots (100d) each defining forward and reverse direction stops (100e,100f) for limiting movement of pins (94) slidably disposed at one end in the slots and fixed at the other end to the gear (74). A torsion spring (96) of low rate resiliently connects the annular member to the pins for reducing the audible gear tooth rattle. Member (100) is snugly constrained against deformation by the annular band (90d) and audible impacts of the stops (100e,100f) are mitigated by the soft material of the annular member (100). A second spring (98) resiliently opposes negative torque spikes to further mitigate audible impacts of stops (100f), a friction damper (99) is operative in response to negative torque effecting flexing of the second spring for further mitigating audible impacts of stops (100f).

14 Claims, 3 Drawing Sheets

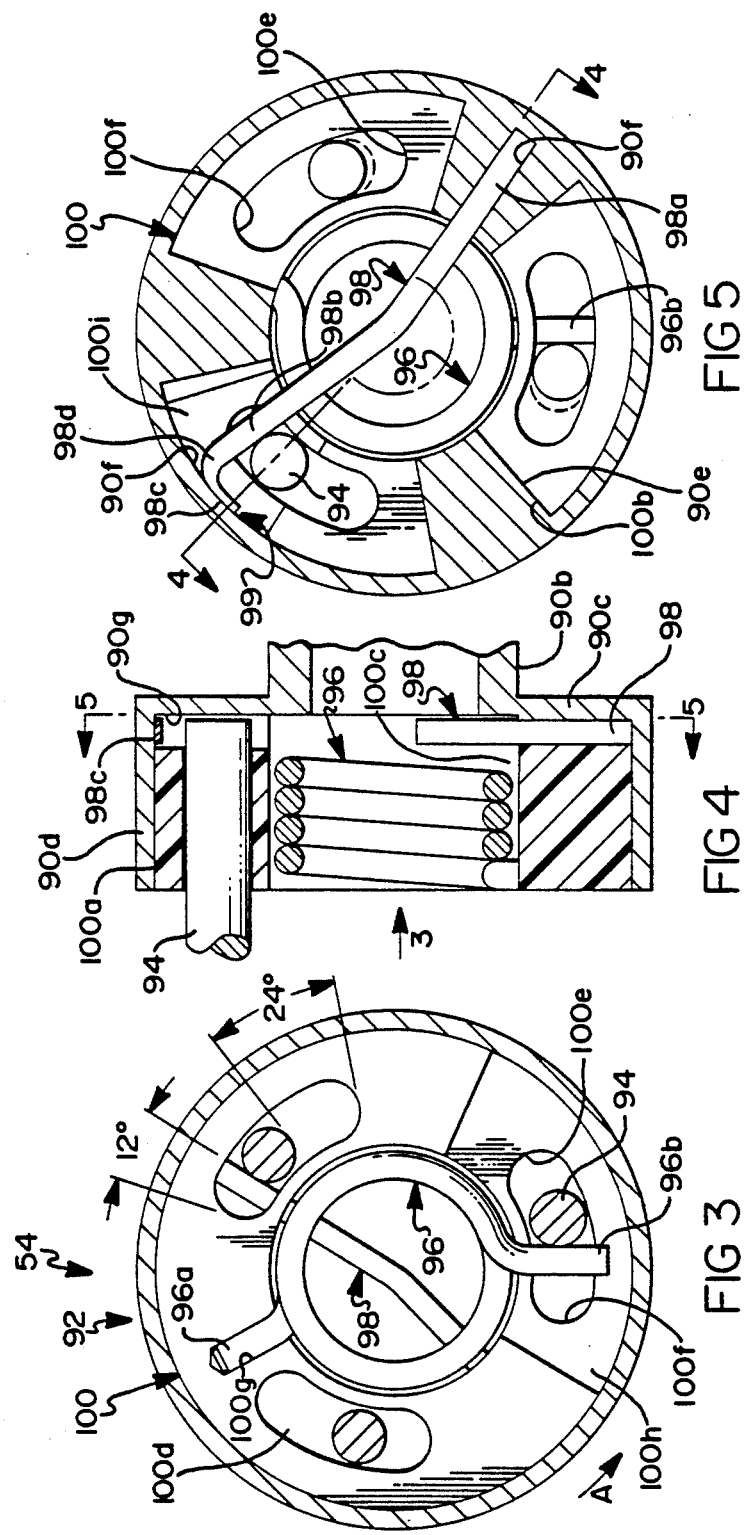

SUPERCHARGER TORSION DAMPING MECHANISM WITH FRICTION DAMPING

CROSS REFERENCE TO RELATED APPLICATIONS

This application is related to U.S. application Ser. Nos. 200,300, pending filed May 31, 1988; 211,944, filed June 27, 1988 now U.S. Pat. No. 4,844,044 granted July 1989; 339,332, pending filed Apr. 14, 1989; and 339,333 pending filed Apr. 14, 1989. These applications are assigned to the assignee of this application and are incorporated herein by reference.

FIELD OF THE INVENTION

This invention relates to a torsion damping mechanism. More specifically, the invention relates to a torsion damping mechanism for reducing audible noise of timing gears in a backflow-type supercharger driven by an internal combustion engine.

BACKGROUND OF THE INVENTION

Rotary blowers of the backflow-type, particularly Roots-type blowers, are characterized by noisy operation. Roots-type blower noise may be roughly classified into two groups: solid borne noise caused by clashing and clanging of components subjected to fluctuating loads, and fluid borne noise caused by fluid flow characteristics such as rapid changes in fluid velocity. The invention of this application is concerned with solid borne noise caused by timing gear rattle and with secondary noise caused by a spring damper.

The timing gears of the Roots-type blowers, such as the blower disclosed in U.S. Pat. No. 4,638,570, may produce an objectionable gear rattle when the meshed teeth of the gears are substantially unloaded. Such unloaded conditions occur during non-supercharging, low engine speed modes of operation. The gear rattle may be mitigated by a damper having a low torque transmitting capacity, low rate spring which is made flexibly operative only during such modes of operation by forward and reverse stops. However, objectionable secondary noise may be cause by impacts of the forward and reverse stops due to abrupt movement of the engine throttle and/or rough low speed engine operation, and by impacts of the reverse stop during engine shut-down.

SUMMARY OF THE INVENTION

An object of this invention is to provide a durable, low cost spring damper which negates objectional rattle noise produced by unloaded gears and which is free of objectionable secondary noise.

Another object of this invention is to provide a torsion damping mechanism which reduces timing gear rattle in a Roots-type blower driven by a periodic combustion engine and which damper prevents objectionable secondary noise during periods when the engine throttle is being abruptly moved, when the engine is being shut-down, and/or when engine is operating roughly at low speeds.

According to a feature of the invention, a torsion damping mechanism is adapted to be rotatably interposed between a first drive rotatably driven in a forward direction by a torque from a periodic combustion engine and a second drive for driving a first gear in constant mesh with a second gear.

The mechanism is characterized by first and second spring means respectively operative to flexibly transmit the positive torque and a negative torque between the drives; and friction damper means engaged in response to negative torque flexing the second spring means.

BRIEF DESCRIPTION OF THE DRAWINGS

The supercharger and torsion damping mechanism of the present invention is shown in the accompanying drawings in which:

FIGS. 3-5 are detailed views of a torsion damping mechanism in FIG. 2.

DETAILED DESCRIPTION OF THE DRAWINGS

Figure 1:
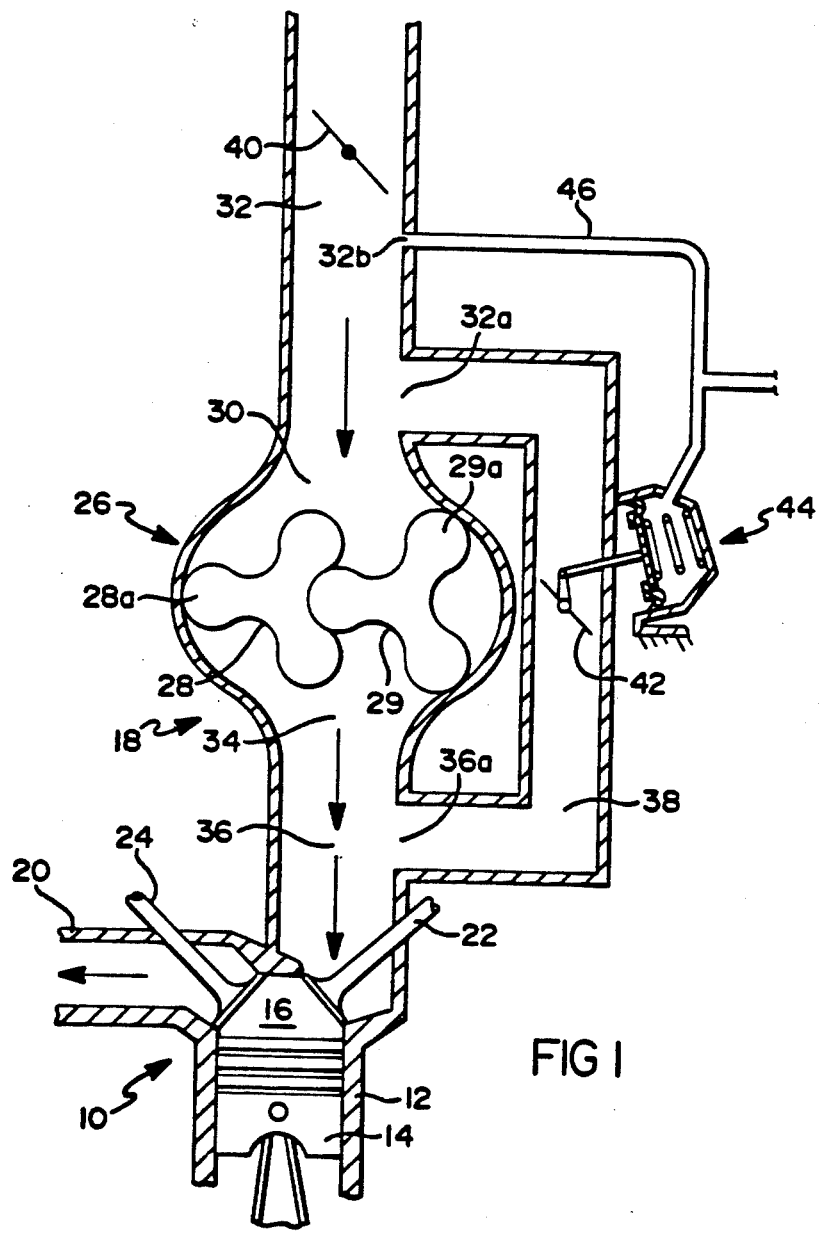
FIG. 1 schematically illustrates an intake manifold assembly having a positive displacement, backflow-type blower or supercharger therein for boosting pressure to an internal combustion engine.

Referring first to FIG. 1, therein is schematically illustrated a portion of an internal combustion engine 10 which is preferably of the periodic combustion type such as the Otto or Diesel cycle type. The engine includes a plurality of cylinders 12 and a reciprocating piston 14 disposed within each cylinder to define an expandable combustion chamber 16, the engine includes intake and exhaust manifold assemblies 18,20 for respectively directing combustion air to-and-from the combustion chambers via intake and exhaust valves 22,24.

The intake manifold assembly 18 includes a positive displacement blower 26 of the backflow or Roots-type having a pair of rotors 28,29 with meshed lobes 28a,29a. The rotors may be mechanically driven by engine crankshaft torque transmitted thereto in known manner via an unshown drive belt. The mechanical drive rotates the blower rotors at a fixed ratio relative to crankshaft speed and such that the blower displacement is greater than the engine displacement, thereby boosting or supercharging the air going to the engine combustion chambers to increase engine power.

The supercharger includes an inlet port 30 receiving an air or air-fuel mixture charge from an inlet duct or passage 32 and a discharge or outlet port 34 directing the charge to the intake valves 22 via a discharge duct or passage 36. The intake and discharge ducts are intercommunicated via a bypass duct or passage 38 connected at openings 32a,36a in the intake and discharge ducts 32,36, respectively. If the engine 10 15 is of the Otto cycle type, a throttle valve 40 preferably controls air or air-fuel mixture flow into intake duct 32 from a source, such as ambient or atmospheric air, in a well known manner.

Disposed within the bypass duct is a bypass valve 42 which is moved between open and closed positions by an actuator assembly 44 responsive to pressure in inlet duct 32 via a line 46 and therefore operative to control supercharging pressure in duct 36 as a function of engine power demand. When bypass valve 42 is in the fully open position, the air pressure in discharge duct 36 is relatively low or a minimum relative to the air pressure in intake duct 32. When the valve is fully closed, the air in the discharge duct is relatively high.

Looking now at FIGS. 2-5, therein is shown a portion of blower 26 in detail. The shown portion includes a housing assembly 48, a rotor assembly 50, an input drive assembly 52, and a torsion damping mechanism 54. Damper mechanism 54 is shown in relief in FIGS. 2 and 4 and in section in FIG. 3. The section of FIG. 3 is taken along line 3—3 of FIG. 4. The supercharger housing assembly includes a main housing section 56 and an input drive section 58 secured together by a plurality of bolts 60 and defining therebetween a gear chamber 62 which normally contains a lubricating oil. The main housing section 56 defines a rotor chamber 64 separated from the gear chamber by an end wall portion 56a having stepped through bores 56b,56c for supporting anti-friction bearings 66 and dynamic seals 68. Main housing section 56 also defines inlet and outlet ports 30,34 and a second unshown end wall portion for closing the left end of chamber 64 and supporting bearings similar to bearings 66.

Figure 2:
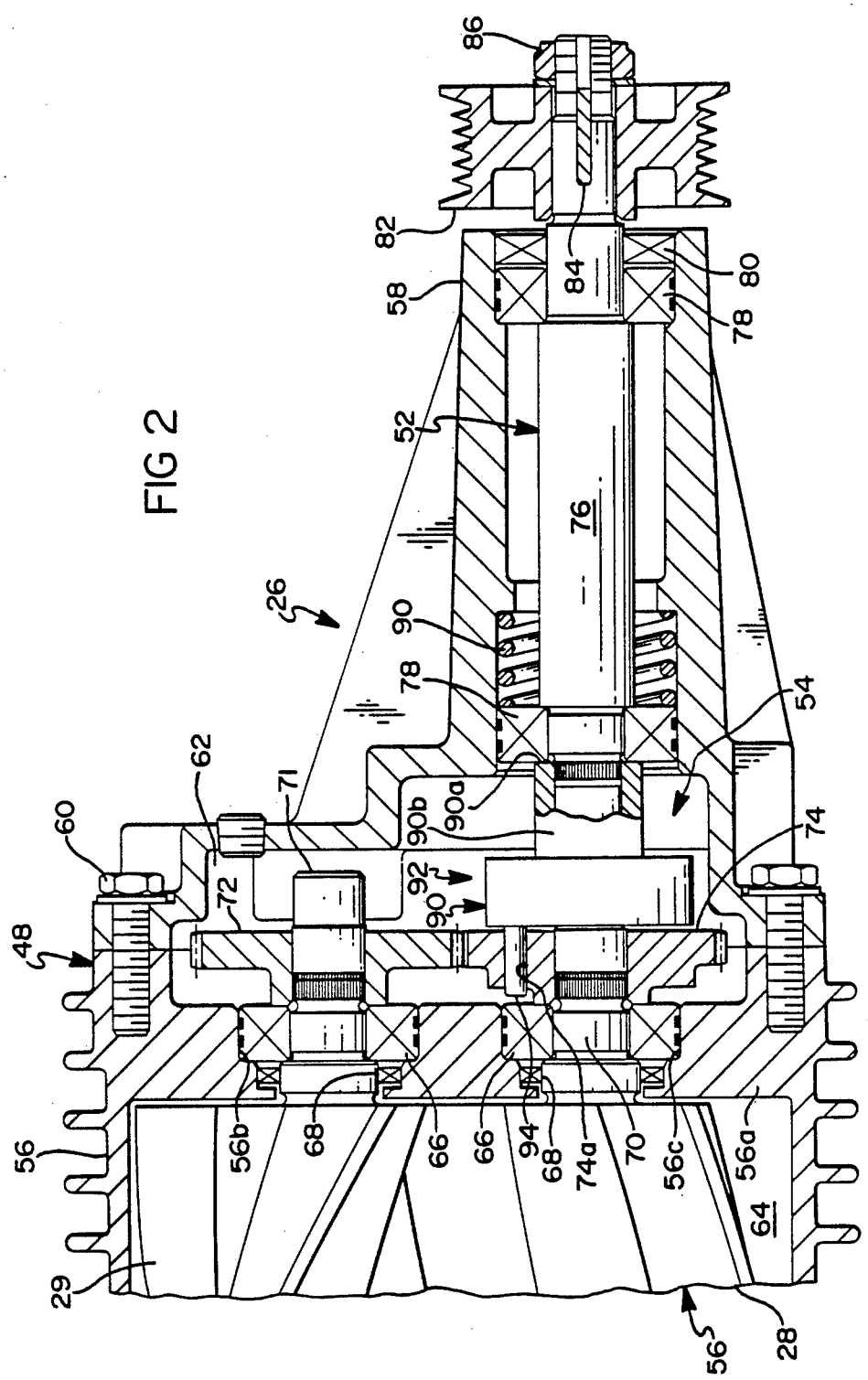
FIG. 2 is a partial, sectional view of the supercharger.

The rotor assembly 50 includes the rotors 28,29, shafts 70,71 fixed to the rotors and supported at both ends by bearings such as bearing 66, and meshed timing gears 72,74 pressed on the right ends of shafts 70,71 and operative to prevent contact of meshing rotor lobes 28a,29a. Rotors 28,29, like housing assembly 48, are preferably formed of a light-weight material, such as aluminum alloy. The rotors may include any number of lobes; herein each rotor includes three lobes 28a,29a. The lobes may be straight, as shown in FIG. 1, or helical, as shown in FIG. 2. A more detailed description of the main housing section and rotor assembly may be found in U.S. Pat. No. 4,638,570 which is incorporated herein by reference.

Input drive assembly 52 includes a shaft 76 supported by anti-friction bearings 78 and axially aligned with the axis of shaft 70, a dynamic seal 80, a pulley 82 secured to shaft 76 by a key 84 and nut 86, and a spring 88 leftwardly biasing the leftwardly disposed bearing 78 against a shoulder 90a to prevent bearing flutter. Shoulder 90a is defined by a sleeve portion 90b pressed on the left end of shaft 76. The sleeve portion forms part of a drive housing 90 of torsion damping mechanism 54 described further hereinafter. Pulley 82 is driven by the previously mentioned and unshown belt which transmits engine torque.

During non-supercharging, low engine speed or idle speed operation the meshed teeth of the timing gears are substantially unloaded and have been known to bounce or clash back and forth against each other through the backlash therebetween. The bounce or clash produces an objectional noise known as gear rattle and is believed to be caused by torsionals in the supercharger drive torque provided by periodic combustion engines such as engine 10. The resilient drive provided by torsion damping assembly 54 reduces the rattle noise below the audible range.

Torsion damping mechanism 54 includes an annular means 92 disposed for rotation about the common axis of shaft 70,76, a set of three axially extending pins 94, and two torsion springs 96,98, and a friction damper 99. Annular means 92 includes the drive housing 90 and an annular member 100 formed of a molded relatively soft or compliant elastomeric material. Drive member 90 is formed of a relatively hard material such as metal or thermoplastic. Drive member 90 includes the sleeve portion 90b, a radially outwardly extending flange portion 90c and an annular axially extending band portion 90d. Flange portion 90c includes three circumferentially spaced apart drive lugs 90e extending axially therefrom. Annular member 100 includes an outer peripheral surface 100a snugly received by band portion 90d, three circumferentially spaced apart recesses 100b receiving drive lugs 90e, a central opening 100c concentric to the common axis, and three circumferentially spaced apart through slots 100d of generally arcuate shape interposed between recesses 100b, and forward and reverse stops 100e,100f defining first and second ends of each slot. Slots 100d extend parallel to the common axis. Pins 94 are press fit at one end into bores 74a of gear 74 and are slidably received at the other end by arcuate slots 100d. Pins 94 and slots 100d may be provided with an amount of radial free play therebetween to mitigate the effects of misalignment of shafts 70,76 and/or components therebetween. The first and second ends or stops 100e,100f limit relative rotation between input and output drives respectively defined by shaft 76 and gear 74. Torsion spring 96 provides a low torque transmitting, low rate resilient drive between the input and output drives which attenuates or isolates torque fluctuations or torque spikes for preventing audible gear tooth rattle of timing gears 72,74 during non-supercharging, low engine speed modes of operation. Spring 98 provides a relatively high rate resilient shock absorber for mitigating audible impacts of pins 94 against stops 100f due to negative torque fluctuations or spikes which often occur during engine shut-down.

Torsion spring 96 includes radially extending, opposite ends or tangs 96a,96b interconnected by a plurality of helically wound coils (herein about 3.5 coils) disposed in central opening 100c of the annular member. End 96a is retained in a blind bore 100g against movement relative to annular member 100. End 96b is disposed for circumferential movement in an axially open, arcuate recess 100h in an end face of annular member 100 and is positioned against one of pins 94 to resiliently transmit torque in the direction of arrow A in FIG. 3 from annular member 100 to gear 74 via pins 94. Herein, torque in the direction of arrow A is taken as positive and in the opposite direction as negative.

As previously mentioned, the primary function of spring 96 is to prevent audible gear tooth rattle of timing gears 72,74 during non-supercharging, low engine speed modes of operation. To prevent gear tooth rattle in this mode of operation, the rate of spring 96 should be such that the natural frequency of the spring-mass system is less than one-quarter of the distributing frequency to provide acceptable isolation. By way of example only for the size supercharger disclosed herein, spring 96 has a rate of about one-third inch pound per degree of movement of end 96b relative to end 96a. The free length of a spring of such low rate would not have enough initial torque transmitting capacity to be operative in a reasonable relative rotation range such as provided by stops 100e,100f. Accordingly, spring 96 is preloaded about 14 degrees to provide the spring with sufficient initial torque transmitting capacity. The preload positions one of pins 94 against a free end of spring 98 when the damping mechanism is in a non-torque transmitting or static state. Spring 96 also lessens the energy of impacts of the first or forward direction stops 100e and in combination with the soft material of member 100 renders such impacts inaudible The elastomeric material of annular member 100 is preferably selected to withstand high frequency, high energy impacts of pins 94 against stops 100e,100f. Hence, it is important to select an elastomer having low hysteresis, so that the material can respond to the impacts and absorb a series of high energy impacts occurring over a short period of time with minimum distortion and minimum audible noise. Acceptable performance has been obtained with materials, having a modulus of elasticity in the range of 10,000 to 40,000 psi over the normal temperature operating range of the damping mechanism and a hardness in the range of 50 to 80 shore D durometer, preferably a range of 55 to 75. Best performance has been obtained with Hytrel TM polyester elastomers from E. I. Du Pont de Nemours and Company. Drive member 90 constrains annular member 100 and is formed of a substantially higher strength and harder material such as metal or a hard thermoplastic. An example of such a hard thermoplastic is Victrex PEEK (polyether-etherketone) having a modulus of elasticity of about 500,000 psi and obtainable from ICI (Imperial Chemical Industries) Advanced Materials Business Group, Wilmington, Del. 19897 U.S.A.

Torsion spring 98, which herein has a square cross-section includes an end 98a retained in an elongated recess 90f in one of the lugs 90e and on end 98b disposed for circumferential movement in an axially facing arcuate recess 100i in an end face of annular member 100 and is positioned against one of pins 94 to resiliently oppose or absorb negative torque or torque spikes to mitigate high velocity, audible impacts of stops 100f. Stops 100e,100f limit maximum relative rotation to thirty-six rotational degrees. Pins 94 are spaced twenty-four and twelve degrees respectively from stops 100e,100f by springs 96,98 during non-torque transmitting or static states of the damping mechanism. Spring 98 has a greater spring rate than spring 96. The rate of spring 98 is preferably an order of magnitude or more greater.

Friction damper 99 includes a first friction surface 98c defined on a radially outwardly facing portion of an L-shaped extension 98d of spring end 98b, and a curved second friction surface 90f defined on a circumferentially inwardly facing surface of band 90d. Friction surfaces 98c,90f are preferably slightly spaced apart or only lightly engaged when in their initial positions of FIG. 5. The surfaces move into increasing frictional engagement in response to negative torque reacting between spring end 98b and pin 94 and moving spring end 98b from an initial position extending along a diameter with respect to the radius of the curved second friction surface. The L-shaped portion has a reduced cross-section for increasing radial compliance and ensuring that the maximum engaging force of the surfaces is less than maximum torque of spring 98 at the friction surface is sufficient to return the surfaces to their initial positions. Alternatively, spring end 98b may have an axially facing friction surface which engages an axially facing surface 90g of flange 90c. Surface 90g may be parallel to the surface of spring end 98b or may be ramped to effect increasing friction engagement as explained above.

A preferred embodiment of the invention has been disclosed herein for illustrative purposes. Many variations and modifications of the disclosed embodiment are believed to be within the spirit of the invention. The following claims are intended to cover inventive portions of the disclosed embodiment and variations and modifications believed to be within the spirit of the inventive portions.

What is claimed is:

1. A torsion damping mechanism adapted to be rotatably interposed between first drive means rotatably driven in one direction by positive torque from a periodic combustion engine and a second drive means for driving a first gear in constant mesh with a second gear; the mechanism characterized by:

first and second spring means respectively operative to flexibly transmit the positive torque and a negative torque between the drives; and friction damper means operative only in response to negative torque flexing the second spring means.

2. The mechanism of claim 1, further including:

annular means disposed for rotation about an axis and fixed to one of the drive means, the annular means including an annular member having a plurality of circumferentially spaced apart and generally arcuate-shaped slots each having first and second ends respectively defining stops in the one direction and the opposite direction of rotation;

axially extending pins each having one end loosely received by one of the slots and the other end fixed to the other drive means; and wherein the friction damper includes;

a first friction surface defined on the annular means and engagable with a second friction surface in response to the negative torque flexing the second spring means.

3. The mechanism of claim 2, wherein the elastomeric material has a hardness in the range of 50–80 shore D durometer.

4. The mechanism of claim 2, wherein the second friction surface is defined on a free end of the second spring means.

5. The mechanism of claim 1, further including:

annular means disposed for rotation about an axis, the annular means including an annular member formed of elastomeric material, and a drive member fixed to one of the drive means and having an annular portion banded about the annular member and formed of rigid material relative to the annular member, the annular member including a plurality of circumferentially spaced apart and generally arcuate-shaped slots each having first and second ends respectively defining stops in the one direction and in the opposite direction of rotation;

axially extending pins each having one end loosely received by one of the slots and the other end fixed to the other drive means; and a first friction surface defined on the drive member and engaged with a second friction surface in response to the negative torque flexing the second spring means.

6. The mechanism of claim 5, wherein the second friction surface is defined on a free end of the second spring means.

7. The mechanism of claim 5, wherein the hardness is in the range of 50–80 shore D durometer.

8. A rotary blower of the backflow-type comprising a housing; first and second meshed lobed rotors rotatably disposed in the housing for transferring relatively low pressure inlet port air to outlet port air controllable between relatively low and high pressures; first and second meshed timing gears respectively fixed to the first and second rotors for preventing contact of the meshed lobes; first drive means adapted to be rotatably driven by a positive torque about an axis in one drive direction at speeds proportional to speeds of a periodic combustion, torque transmitting engine selectively controllable between idle and maximum speeds; a second drive means fixed to one of the timing gears; a torsion damping mechanism rotatably disposed between the drives and characterized by:

first and second spring means respectively operative to flexibly transmit the positive torque and a negative torque between the drives; and friction damper means operative only in response to negative torque flexing the second spring means.

9. The mechanism of claim 8, further including:

annular means disposed for rotation about an axis and fixed to one of the drive means, the annular means including an annular member having a plurality of circumferentially spaced apart and generally arcuate-shaped slots each having first and second ends respectively defining stops in the one direction and the opposite direction of rotation;

axially extending pins each having one end loosely received by one of the slots and the other end fixed to the other drive means; and wherein the friction damper includes;

a first friction surface defined on the annular means and engagable with a second friction surface in response to the negative torque flexing the second spring means.

10. The mechanism of claim 9, wherein the elastomeric material has a hardness in the range of 50-80 shore D durometer.

11. The mechanism of claim 9, wherein the second friction surface is defined on a free end of the second spring means.

12. The mechanism of claim 8, further including:

annular means disposed for rotation about an axis, the annular means including an annular member formed of elastomeric material, and a drive member fixed to one of the drive means and having an annular portion banded about the annular member and formed of rigid material relative to the annular member, the annular member including a plurality of circumferentially spaced apart and generally arcuate-shaped slots each having first and second ends respectively defining stops in the one direction and in the opposite direction of rotation;

axially extending pins each having one end loosely received by one of the slots and the other end fixed to the other drive means; and a first friction surface defined on the drive member and engaged with a second friction surface in response to the negative torque flexing the second spring means.

13. The mechanism of claim 12, wherein the second friction surface is defined on a free end of the second spring means.

14. The mechanism of claim 12, wherein the hardness is in the range of 50-80 shore D durometer.

* * * * *

UNITED STATES PATENT AND TRADEMARK OFFICE
CERTIFICATE OF CORRECTION

PATENT NO. : 4,944,279
DATED : July 31, 1990
INVENTOR(S) : Steven W. Woodard

It is certified that error appears in the above-identified patent and that said Letters Patent is hereby corrected as shown below:

3. The mechanism of claim 2, wherein, the <u>annular member is formed of an</u> elastomeric material [has] <u>having</u> a hardness in the range of 50-80 shore D durometer.

7. The mechanism of claim 5, wherein the <u>elastomeric material</u> has hardness [is] in the range of 50-80 shore D durometer.

10. The mechanism of claim 9, wherein the <u>annular member is formed of an</u> elastomeric material [has] <u>having</u> a hardness in the range of 50-80 shore D durometer.

14. The mechanism of claim 12, wherein the <u>elastomeric material has</u> hardness [is] in the range of 50-80 shore D durometer.

Signed and Sealed this

Twenty-ninth Day of September, 1992

Attest:

DOUGLAS B. COMER

*Attesting Officer*  *Acting Commissioner of Patents and Trademarks*